United States Patent Office 2,975,127
Patented Mar. 14, 1961

2,975,127
METHOD OF CONVERTING AN AQUEOUS DRILLING FLUID TO A PACKER FLUID

Walter J. Weiss, Sugar Land, and Clarence O. Walker and John S. Brukner, Houston, Tex., assignors to Texaco Inc., a corporation of Delaware No Drawing. Filed Dec. 6, 1957, Ser. No. 700,969

8 Claims. (Cl. 252—8.55)

This invention relates to drilling fluids and to the drilling of wells through subsurface formations by means of well drilling tools. This invention particularly relates to a drilling operation, such as a rotary drilling operation, which involves the circulation of a drilling fluid down the well bore, about the drilling bit and back to the surface. In a rotary drilling operation a drilling fluid is pumped down the drill stem to the drilling bit at the bottom of the bore hole. The stream of drilling fluid then passes through the drilling bit and moves upwardly within the annular space between the drill stem and the well bore wall carrying with it the drilling cuttings.

After the drilling operation has been concluded, or during a halt in the drilling operation, sometimes a portion of the drilling fluid is left behind in the bore hole to serve as a packer fluid during subsequent testing of the petroleum producing formation and/or production of petroleum therefrom and/or the well completion operations.

Packer fluids are sometimes subjected to fairly high temperatures, e.g., above about 250° F., for a substantial length of time, days and even months. It is desirable, therefore, that a well packer fluid be thermally stable and remain fluid or readily pumpable even after exposure to high temperatures for prolonged periods of time. Sometimes, however, due to prolonged exposure at a relatively high temperature within the well bore the packer fluids tend to become unpumpable and form plastic, almost rock-like materials. When this occurs casing and tubing and other equipment in contact with the packer fluid become, in effect, cemented therein. Moreover, when this occurs the packer fluid cannot readily be removed from the well bore. In this event it is necessary to mechanically remove or actually drill out the packer fluid, perhaps at the same time losing valuable equipment and increasing the cost of the well.

Drilling fluids which contain calcium hydroxide generally cannot be satisfactorily employed as packer fluids. Drilling muds having a relatively high proportion of calcium hydroxide therein, such as an aqueous phase which is saturated with calcium hydroxide, together with excess calcium hydroxide, when subjected to a relatively high temperature for prolonged periods of time under relatively static conditions tend to harden and form a cement-like material. Because of the difficulties which have arisen when such fluids have been exposed to relatively high temperatures for substantial lengths of time, present practices are tending to replace these types of muds with freshly prepared packer fluids.

Accordingly, it is an object of this invention to provide a method whereby a lime drilling fluid or a drilling fluid characterized by the presence of a substantial amount of calcium hydroxide therein, such as in the aqueous phase thereof, might be satisfactorily treated so that it can be suitably employed as a packer fluid.

Another object of this inventino is to provide a method for converting a calcium hydroxide-containing drilling fluid into a relatively temperature stable fluid which might be suitably employed as a packer fluid during well completion.

Still another object of this invention is to provide an improved well drilling operation.

Yet another object of this invention is to provide in a well drilling operation an improved method for converting a lime-containing or lime-base drilling mud into a temperature stable packer fluid.

How these and other objects of this invention are accomplished will become apparent in the light of the accompanying disclosure. In accordance with this invention it has now been discovered that an aqueous calcium hydroxide-containing drilling fluid or a lime drilling mud is convertible into a relatively temperature stable packer fluid by treating the calcium hydroxide-containing drilling fluid with a chemical treating agent which reacts with calcium hydroxide to form a substantially water insoluble hydroxide, i.e., the hydroxyl component of the calcium hydroxide in the drilling fluid is removed therefrom, e.g., precipitated as a water insoluble hydroxide. Preferably, the same chemical treating agent also forms an insoluble calcium compound with the calcium component of calcium hydroxide.

Various types of calcium hydroxide-containing fluids are suitably converted in accordance with the practice of this invention into a relatively temperature stable packer fluid. For example, a so-called low lime drilling fluid which is usually characterized as an aqueous drilling fluid containing an alkaline (pH about 12.5) aqueous phase which is saturated with calcium hydroxide and which contains a small amount, in the range about 0.125–1.0 lb., of sodium hydroxide therein thereby yielding a drilling fluid having a relatively low calcium ion concentration, below about 200–250 parts per million by weight (p.p.m.), is readily converted in accordance with the practice of this invention into a temperature stable packer fluid. Further, a so-called high pH lime mud such as an aqueous drilling mud having an aqueous phase which is saturated with calcium hydroxide and which contains dissolved therein a relatively large amount of sodium hydroxide, such as an amount of sodium hydroxide in the range of 1–6 lbs. per barrel of drilling fluid, is suitably converted in accordance with the practice of this invention into a temperature stable packer fluid. A high pH lime mud generally has a pH substantially above 12.5, such as a pH in the range 12.6–13.5, depending upon the amount of sodium hydroxide added thereto. A high pH lime mud is further characterized by having an alkaline aqueous phase which contains a relatively low dissolved calcium or calcium ion concentration, e.g., a calcium ion concentration below about 200 p.p.m., usually below about 100 p.p.m.

The practice of this invention is particularly applicable to converting a high calcium, relatively low pH lime drilling fluid which has an aqueous phase characterized by a relatively high dissolved calcium or calcium ion concentration, above about 200 p.p.m., preferably in the range 300–1500 p.p.m., into a temperature stable packer fluid. The aqueous phase of this type of calcium hydroxide-containing drilling fluid is characterized by a relatively low pH, not in excess of 12.6, the pH corresponding to a saturated aqueous solution of calcium hydroxide. A mud of this type might be designated as a low pH, high calcium lime mud and has been found to be very useful for drilling through heaving shale formations. This type of mud is more thoroughly described in U.S. 2,802,783, issued August 13, 1957, the disclosures of which patent are herein incorporated and made a part of this disclosure.

As indicated hereinabove, in accordance with the practice of this invention a calcium hydroxide-containing aqueous drilling fluid is convertible into a temperature stable packer fluid by treating said drilling fluid with a chemical treating agent such as a water soluble metal salt, the hydroxide of the metal of which salt is substantially water insoluble, and preferably the anion portion of which salt forms a water insoluble compound with the calcium derivable from the calcium hydroxide in the drilling fluid, so that by metathetical reaction with calcium hydroxide the resulting water insoluble metal hydroxide and corresponding water insoluble calcium compound (anion) are formed, thereby removing substantially all of the calcium hydroxide from the aqueous phase of the drilling fluid.

Any compound or chemical treating agent which by metathetical reaction with calcium hydroxide leads to the formation of a substantially water insoluble hydroxide and a substantially water insoluble calcium-containing compound, thereby removing the calcium and hydroxyl components of the calcium hydroxide from the aqueous phase of the drilling fluid, may be satisfactorily employed in the practice of this invention.

Water insoluble hydroxides include nickel hydroxide, chromium hydroxide, magnesium hydroxide, aluminum hydroxide, iron hydroxide, tin hydroxide, copper hydroxide, zinc hydroxide and others. Accordingly, the corresponding water soluble salts of these metals, such as the water soluble chloride, nitrate, sulfate, acetate, salts of these metals, preferably the fluoride salts thereof since $CaF_2$ is substantially water insoluble, are satisfactorily employed as the chemical treating agents in accordance with this invention. As indicated hereinabove, preferably an amount of chemical treating agent is employed sufficient to chemically remove or precipitate substantially all of the calcium hydroxide (hydroxyl, and preferably also calcium, components thereof together with any extraneous dissolved calcium) from the drilling fluid being treated into the corresponding water insoluble metal hydroxide and insoluble calcium compound. Usually only a minor amount, based on the total treated fluids of the above mentioned chemical treating agents need be added to the drilling fluid undergoing treatment. It has been found that an amount of chemical treating agent in the range 0.25-20 lbs. per barrel, more or less, depending upon the molecular or equivalent weight of the chemical treating agent, yields satisfactory results.

Chemical treating agents which are suitably employed in the practice of this invention include magnesium fluoride, magnesium carbonate, magnesium oxalate, aluminum chloride, aluminum fluoride, aluminum sulfate, chromium oxide, chromium sulfate, chromium fluoride, chromium chloride, nickel chloride, nickel fluoride and nickel sulfate. Various other treating agents which form a water insoluble hydroxide by reaction with the calcium hydroxide present in the drilling mud but which do not form an insoluble calcium compound are suitably employed in the practice of this invention. These materials include magnesium sulfate, magnesium chloride, magnesium acetate, magnesium citrate, magnesium gluconate as well as the corresponding chromium, aluminum and nickel compounds. The citrate and gluconate compounds of these metals are particularly useful since, although calcium gluconate and calcium citrate are relatively soluble, these compounds do not ionize to a substantial extent with the result that the calcium ion concentration in an aqueous phase containing these compounds remains at a relatively low level. In the practice of this invention, however, it is desirable, when a chemical treating agent is employed which does not yield a water insoluble calcium compound, to incorporate in the drilling mud undergoing treatment a compound which reacts with the calcium present in the drilling mud to precipitate calcium therefrom as a water insoluble calcium compound. Suitable such treating agents include sodium carbonate, sodium oxalate, sodium fluoride and the like since the corresponding compounds are substantially water insoluble.

It has further been found that complex salts, if containing the desirable elements of this invention are also useful, e.g. cryolite $Na_3AlF_6$.

The following data are illustrative of the practices of this invention. Portions of aqueous drilling muds characterized by the presence of calcium hydroxide therein, such as an alkaline aqueous phase saturated with calcium hydroxide, were treated by incorporating therein various chemical agents in accordance with the practice of this invention. The untreated and treated portions of the mud were then subjected to aging at a suitable high temperature for a prolonged period of time. After high temperature aging the shear value of the mud was tested and its appearance observed. The results of these tests are set forth in the accompanying Table I.

*Table I*

| Mud | $P_m$ | $P_f$ | $M_f$ | pH | Shear, lbs/100 ft.$^2$ after aging at 350-375° F. for 24 hrs. | Appearance after aging |
|---|---|---|---|---|---|---|
| Mud A | 6.6 | .7 | 2.3 | | 836 | Plastic. |
| Mud A+2#/bbl. $MgCO_3$ | 3.7 | .3 | 1.7 | | 278 | Fluid, Low Gels. |
| Mud A+4#/bbl. $MgCO_3$ | 1.7 | .1 | 1.7 | | 278 | Do. |
| Mud B | 7.1 | .6 | 1.6 | 11.88 | 1,450 | Plastic. |
| Mud B+4#/bbl. $MgF_2$ | 3.2 | .3 | 1.2 | 11.21 | 650 | Fluid, High Gels. |
| Mud B+6#/bbl. $MgF_2$ | 2.9 | .2 | 1.2 | 11.08 | 265 | Fluid, Medium to High Gels. |
| Mud B+8#/bbl. $MgF_2$ | .1 | 0 | 1.2 | 9.17 | 195 | Fluid, Low Gels. |
| Mud C | 9.3 | 1.7 | 2.7 | 11.79 | 2,200 | Solid. |
| Mud C+2#/bbl. $AlCl_3·6H_2O$ | 3.8 | .5 | 1.5 | 10.82 | 763 | Fluid to Plastic. |
| Mud C+6#/bbl. $AlCl_3·6H_2O$ | .1 | 0 | 1.0 | 8.12 | 250 | Fluid, Medium Gels. |
| Mud C+6#/bbl. $AlF_3$ | .5 | .1 | .9 | 8.85 | 233 | Do. |
| Mud D | 7.7 | 1.7 | 5.1 | 12.27 | 4,150 | Solid. |
| Mud D+4#/bbl. $Al_2(SO_4)_3$ | 2.2 | 1.0 | 5.5 | 10.72 | 1,025 | Fluid to Plastic. |
| Mud E | 9.3 | 1.7 | 2.7 | 11.79 | 2,800 | Plastic. |
| Mud E+4#/bbl. $CrCl_3·6H_2O$ | 1.3 | 0.2 | 1.0 | 9.72 | 550 | Fluid, High Gels. |
| Mud E+4#/bbl. $CrF_3$ | 0.8 | 0.1 | 0.9 | 9.05 | 725 | Fluid, Medium to High Gels. |
| Mud F | 12.6 | 1.8 | 4.0 | 11.7 | 3,275 | Plastic. |
| Mud F+6#/bbl. $CrF_3$ | 0.5 | 0 | 1.7 | 8.5 | 450 | Fluid, Medium Gels. |
| Mud G | 3.6 | 0.4 | 2.4 | 10.9 | 820 | Borderline Plastic. |
| Mud G+6#/bbl. $NiCl_2·6H_2O$ | 0 | 0 | 1.5 | 7.8 | 441 | Fluid, High Gels. |
| Mud G+2#/bbl. $NiF_2$ | 1.7 | 0.2 | 2.5 | 10.4 | 441 | Borderline Fluid. |
| Mud G+6#/bbl. $NiCl_2·6H_2O$+6#/bbl. $NiF_2$ | 0 | 0 | 2.6 | 6.2 | 415 | Fluid, Medium to High Gels. |

$P_m$ is defined as number of cc. of $N/50$ $H_2SO_4$ required to titrate 1 cc. of the whole mud.
$P_f$ is defined as number of cc. of $N/50$ $H_2SO_4$ required to titrate 1 cc. of aqueous phase (filtrate) of drilling fluid to a phenolphthalein end point and is a measure of the soluble hydroxyl ion content.
$M_f$ is defined as number of cc. of $N/50$ $H_2SO_4$ required to titrate 1 cc. of aqueous phase (filtrate) of drilling fluid to methyl orange end point and is a measure of the soluble hydroxyl and carbonate ion content.
Mud A—A calcium hydroxode containing field mud.
Mud B—A calcium hydroxide containing field mud, wt. 12.3#/gal., 21.5% vol. solids.
Mud C—A calcium hydroxide containing field mud, wt. 10.4#/gal., 14% vol. solids.
Mud D—A low pH, high calcium lime mud, wt. 15.4#/gal., 33% vol. solids.
Mud E—A calcium hydroxide containing field mud, wt. 10.4#/gal., 14% vol. solids, 6% vol. oil emulsified therein.
Mud F—A calcium hydroxide containing field mud, wt. 15.5#/gal., 31% vol. solids, 8% vol. oil emulsified therein.
Mud G—A low pH, high calcium lime mud, wt. 15.5#/gal., 32% vol. solids, 8% vol. oil emulsified therein.

As clearly indicated by the data set forth in the accompanying Table I a calcium hydroxide-containing drilling fluid when treated in accordance with the practice of this invention with a chemical treating agent to remove substantially all of the calcium hydroxide therefrom exhibits improved high temperature stability with respect to fluidity, thereby rendering the resulting treated drilling fluid more suitable as a well packer fluid.

As will be apparent to those skilled in the art in the light of the foregoing disclosure, many modifications, substitutions and changes are possible without departing from the spirit or scope of this invention.

We claim:

1. In a drilling operation wherein an aqueous drilling mud which contains an aqueous phase saturated with respect to calcium hydroxide is employed during the drilling operation and wherein a portion of said aqueous drilling mud is left in the bore hole as a packer fluid, the improvement which comprises adding to said portion of said aqueous drilling mud a water soluble metal salt which reacts with the calcium hydroxide dissolved in said aqueous phase to form a substantially water insoluble corresponding metal hydroxide and wherein said metal salt also reacts with the calcium hydroxide dissolved in said aqueous phase to form a substantially water insoluble calcium compound comprising calcium and the anion component of said metal salt, said metal salt being added in an amount sufficient to precipitate substantially all of said calcium hydroxide in said portion of said drilling mud.

2. A method of converting an aqueous drilling fluid which contains an alkaline aqueous phase having a pH not in excess of 12.6, said aqueous phase containing hydratable clayey material dispersed therein and having a calcium ion concentration in excess of 200 parts per million by weight based on said aqueous phase, said aqueous phase being saturated with calcium hydroxide, which comprises incorporating in said drilling fluid an amount of a water soluble metal salt which by reaction with calcium hydroxide dissolved in said aqueous phase forms a corresponding water insoluble metal hydroxide and wherein the anion component of said water soluble metal salt by reaction with calcium dissolved in said aqueous phase forms a substantially water insoluble calcium compound so as to remove substantially all of the dissolved calcium hydroxide from said aqueous phase.

3. A method in accordance with claim 2 wherein said water soluble metal salt is selected from the group consisting of the water soluble salts of magnesium, aluminum, chromium, nickel and iron.

4. A method in accordance with claim 2 wherein said metal salt is magnesium carbonate.

5. A method in accordance with claim 2 wherein said metal salt is magnesium fluoride.

6. A method in accordance with claim 2 wherein said metal salt is aluminum fluoride.

7. A method in accordance with claim 2 wherein said metal salt is chromium fluoride.

8. A method in accordance with claim 2 wherein said metal salt is nickel fluoride.

References Cited in the file of this patent

UNITED STATES PATENTS

| | | |
|---|---|---|
| 2,343,113 | Jones | Feb. 29, 1944 |
| 2,391,622 | Dunn | Dec. 25, 1945 |
| 2,491,437 | Perkins | Dec. 13, 1949 |
| 2,605,221 | Hoeppel | July 29, 1952 |
| 2,793,996 | Lummus | May 28, 1957 |
| 2,802,783 | Weiss et al. | Aug. 13, 1957 |
| 2,836,556 | Thompson et al. | May 27, 1958 |

OTHER REFERENCES

Jones: Chemical Treatment of Cement-Contaminated Drilling Muds, World Oil, May 1949, pp. 106 to 112.

Rogers: Composition and Properties of Oil Well Drilling Fluids, Revised Ed., pub. 1953 by Gulf Pub. Co. of Houston, Texas, pp. 457, 458 and 459.

McLaurin et al.: New High Weight Mud Saves Rig Time, The Petroleum Engineer, December 1955, pp. B83, B84 and B85.